US007561785B2

(12) United States Patent
Hirunuma et al.

(10) Patent No.: US 7,561,785 B2
(45) Date of Patent: Jul. 14, 2009

(54) LOCK MECHANISM FOR STAGE APPARATUS

(75) Inventors: Ken Hirunuma, Tokyo (JP); Satoru Nemoto, Saitama (JP); Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 494 days.

(21) Appl. No.: 11/539,186

(22) Filed: Oct. 6, 2006

(65) Prior Publication Data

US 2007/0096477 A1 May 3, 2007

(30) Foreign Application Priority Data

Oct. 6, 2005 (JP) ............................ 2005-294090

(51) Int. Cl.
*G03B 17/00* (2006.01)

(52) U.S. Cl. .......................... 396/55; 292/150; 33/1 M

(58) Field of Classification Search .................. 396/55; 292/150; 33/1 M See application file for complete search history.

(56) References Cited

FOREIGN PATENT DOCUMENTS

JP 3431020 5/2003

OTHER PUBLICATIONS

U.S. Appl. No. 11/539,193 to Hirunuma et al., filed Oct. 6, 2006.
U.S. Appl. No. 11/539,188 to Hirunuma et al., filed Oct. 6, 2006.

*Primary Examiner*—W. B. Perkey
*Assistant Examiner*—Fang-Chi Chang
(74) *Attorney, Agent, or Firm*—Greenblum & Bernstein, P.L.C.

(57) ABSTRACT

A lock mechanism for a stage apparatus includes a movable stage; a pair of engaging members provided on the movable stage; a pair of lock members positioned between the engaging members and movable along an imaginary straight line passing through the engaging members; a first link member movable along a reference straight line between the lock members; a pair of second link members rotatably mounted on the first link member and rotatably mounted on the lock members; a lock driving device which moves the lock members mutually away from each other to engage with the engaging members by moving the first link member along the reference straight line; and an unlock driving device which moves the lock members mutually toward each other so as to disengage with the engaging members by moving the first link member in the other direction along the reference straight line.

9 Claims, 12 Drawing Sheets

LOCK MECHANISM FOR STAGE APPARATUS

BACKGROUND OF THE INVENTION

1. Field of the Invention

The present invention relates to a lock mechanism for a stage apparatus which locks a movable stage of the stage apparatus in a non-operational state when the movable stage, which is freely movable along a specific plane, is in a non-operational state.

2. Description of the Prior Art

An example of a movable stage which is movable in a specific X-direction and a Y-direction orthogonal to the X-direction, and to which an image pickup device is fixed on a front surface thereof, is disclosed in Japanese Patent No. 3431020. The lock mechanism disclosed therein is provided with one cylindrical boss projecting from the back surface of a movable stage, and first and second abutting members provided behind the movable stage on mutually opposing sides of the cylindrical boss. The first and second abutting members are movable in a direction parallel to the movable stage.

When the movable stage is in a non-operational state where no hand-shake correction is performed, the first abutting member and the second abutting member mutually move toward a locked position. Accordingly, since approximately half-circle shaped engaging recesses, respectively formed on opposing surfaces of the first and second abutting members, clasp the cylindrical boss, the movable stage is locked by the first and second abutting members.

Since the above described lock mechanism is a construction whereby one cylindrical boss is clasped by the approximately half-circle shaped engaging recesses of the first and second abutting members, the movable stage cannot be securely locked without the first and second abutting members contacting the cylindrical boss with a strong force.

However, in order for the first and second abutting members to contact the cylindrical boss with a strong force, the size of the driving device of the lock mechanism needs to be increased, which undesirably increases the size of the lock mechanism and the stage apparatus.

Furthermore, in the case where this lock mechanism of the prior art is applied to a camera-shake (hand-shake) correction apparatus which corrects 'rotational shake', an additional problem occurs. Namely, in this kind of camera-shake correction apparatus, the stage is rotatable. However, in the above described lock mechanism of the prior art, since there is only one boss (i.e., the cylindrical boss), even if the first and second abutting members clasp this boss, the movable stage cannot be locked so as to be prevented from being rotated.

SUMMARY OF THE INVENTION

The present invention provides a lock mechanism for a stage apparatus which can lock a movable stage thereof without requiring a large driving force, and can prevent the movable stage from being rotated when in a locked state.

According to an aspect of the present invention, a lock mechanism for a stage apparatus is provided, including a movable stage which is provided on a stationary member movable in a reference plane; a pair of engaging members provided on the movable stage; a pair of lock members which are positioned between the engaging members and are movable so as to engage and disengage with corresponding the engaging members, the lock members being movable along a straight imaginary line passing through the engaging members; a first link member which is movable in a plane parallel to the reference plane in a direction along a reference straight line which passes through a central position of pair of the engaging members and is orthogonal to the moving direction of the lock members; a pair of second link members symmetrically arranged with respect to the reference straight line, wherein one end of each of the second link members is rotatably mounted on the first link member via a first rotational axis, and the other end of each of the second link members is rotatably mounted on a corresponding the lock member via a second rotational axis, the first and second rotational axes extending normal to the reference plane; a lock driving device which moves the lock members to an engaged position wherein the lock members mutually move away from each other and engage with the corresponding engaging members by moving the first link member in one direction along the reference straight line; and an unlock driving device which moves the lock members to a disengaged position wherein the lock members mutually move toward each other so as to disengage with the corresponding engaging members by moving the first link member in the other direction along the reference straight line.

It is desirable for each of the second link members to be a linear shaped member; and for the lock members to be positioned at the engaged position when axial lines of the link members extend in a common straight line which is aligned in a direction of the straight imaginary line passing through the lock members.

It is desirable for the lock driving device to include a magnetic-force generator provided on one of the first link member and the stationary member; and a drive coil fixed to the other of the first link member and the stationary member, the drive coil generating a linear drive force in a direction along the reference straight line upon receiving electric current while receiving a magnetic force from the magnetic-force generator. The linear drive force in the direction along the reference straight line is converted into a linear drive force along the straight imaginary line passing through the lock members via the first link member and the second link members.

It is desirable for the unlock driving device to include a biasing device, each end of which is connected to the first link member and the stationary member, respectively, so as to exert a biasing force in the reference straight line direction.

It is desirable for the lock mechanism to include a first retaining device for holding the lock members at the engaged position upon the lock members being moved to the engaged position; and a second retaining device for holding the lock members at the disengaged position upon the lock members being moved to the disengaged position.

It is desirable for the first retaining device to include a magnet fixed to one of the first link member and the stationary member; and a magnetic plate which is magnetically attracted to the magnet so as to contact each other when the first link member and the second link members are positioned at the engaged position.

It is desirable for the second retaining device to include a biasing device which biases the first link member and the second link members to the disengaged position.

It is desirable for the second retaining device to include a magnet which is fixed to one of the first link member and the stationary member; and a magnetic plate fixed to the other of the first link member and the stationary member, the magnetic plate being magnetically attracted to the magnet so as to contact each other when the first link member and the second link members are positioned at the disengaged position.

It is desirable for at least one of the lock members to resiliently engage with a corresponding engaging member.

According to the present invention, since a pair of engaging members are locked by a pair of arm members from the inner sides of the engaging members when the movable stage is in a non-operational state, the movable stage can be securely held (retained) at a predetermined position without requiring a large engaging force. Furthermore, since the lock members and the engaging members are engaged via a larger output force than the force input to the link mechanism, the engaging members can be securely locked with a large force.

In addition, no force is exerted in a direction normal to the stationary member from the lock members to the engaging members during a locking operation. Therefore, if the lock mechanism of the present invention is applied to a camera-shake correction apparatus, the image pickup device is not moved in the optical axis direction during a locking operation of the movable stage, and hence, such a locking operation has no adverse effect on the focus state of the image pickup device.

Furthermore, since the lock members and the link mechanism are positioned in between the pair of engaging members, the lock mechanism can be miniaturized. Furthermore, since the construction of the link mechanism of the present invention is very simple, a reduction in manufacturing costs is also possible The present disclosure relates to subject matter contained in Japanese Patent Application No. 2005-294090 (filed on Oct. 6, 2005) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

A first embodiment of the present invention will be described hereinafter with reference to FIGS. 1 through 12. In the following description, as shown by the arrows in FIGS. 1 and 2, the left/right direction, the upward/downward direction, and the forward/rearward direction of a camera-shake correction apparatus (hand-shake correction apparatus/stage apparatus) 30 is defined as the X-direction, the Y-direction and the Z-direction, respectively.

Firstly the camera-shake correction apparatus 30, which has a lock mechanism 100 of the present invention installed therein, will be described.

Figure 1:
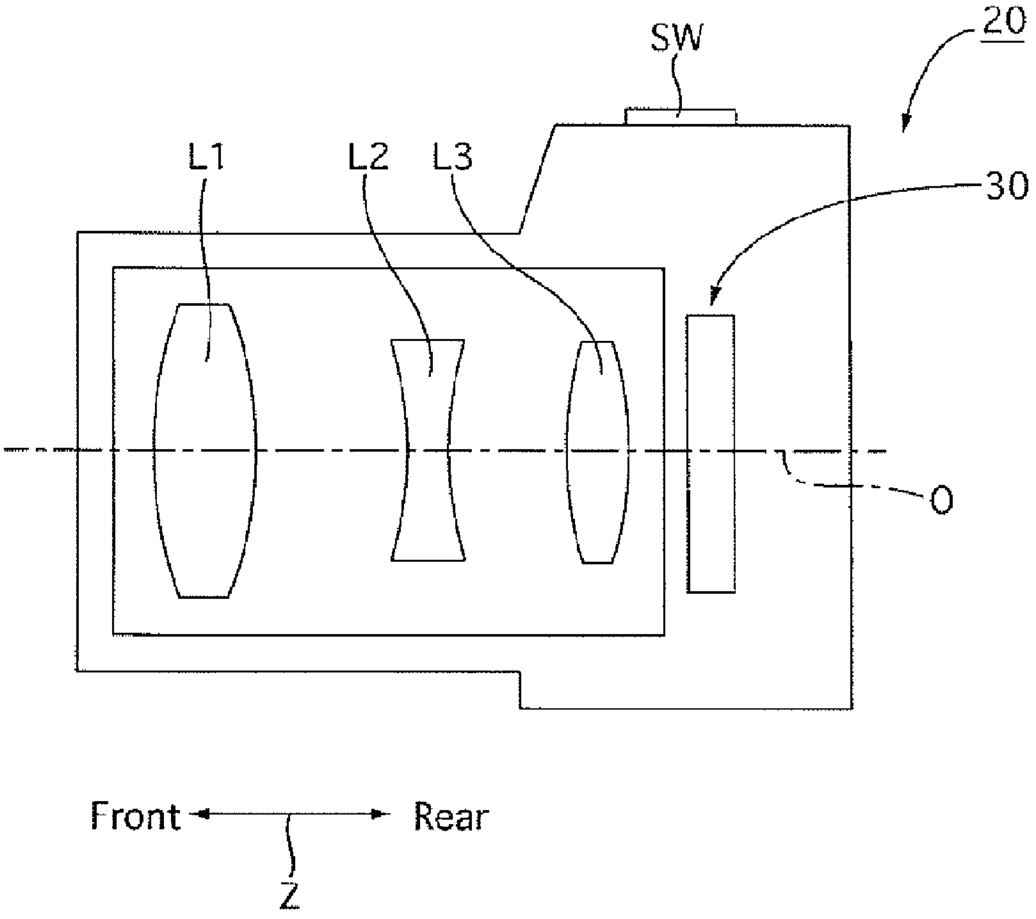
FIG. 1 is a longitudinal sectional view of a digital camera having installed therein a camera-shake correction apparatus according to a first embodiment of the present invention.

As shown in FIG. 1, an optical system having first, second and third lens groups L1, L2 and L3, is provided in a digital camera 20, and the camera-shake correction apparatus 30 is provided behind the third lens group L3.

Figure 2:
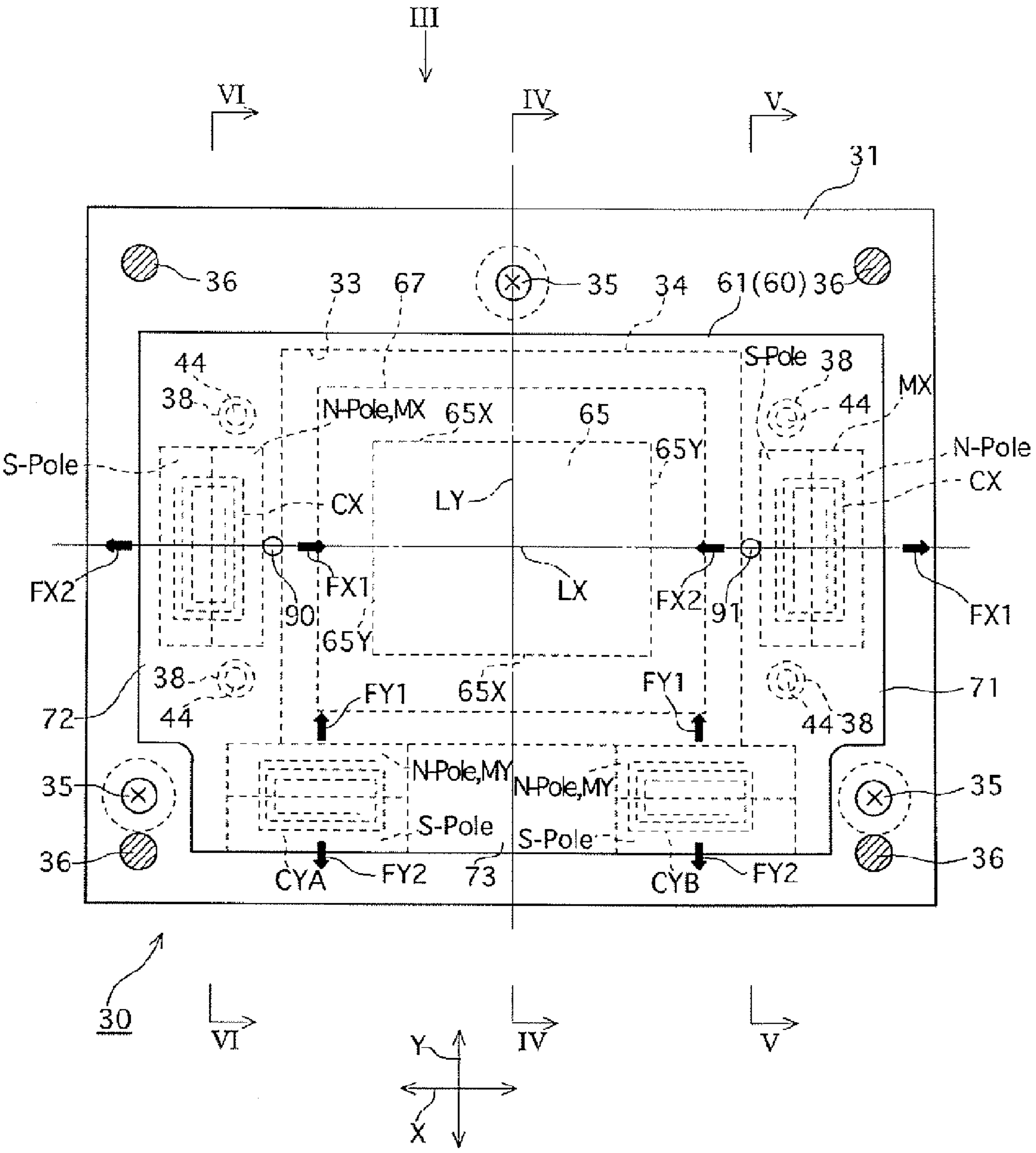
FIG. 2 is a rear view of the camera-shake correction apparatus with the rear plate omitted for clarity.

The camera-shake correction apparatus 30 has a construction as shown in FIGS. 2 through 6. As shown in FIGS. 2 through 6, the camera-shake correction apparatus 30 is provided with a front stationary support board (stationary member) 31, which has a horizontal rectangular shape (as viewed from the front thereof) and is made from a magnetic material such as a soft iron, and a rear stationary support board (stationary member) 32 having the same size and shape as that of the front stationary support board 31 and is also made from a magnetic material such as a soft iron. The front stationary support board 31 and the rear stationary support board 32 are connected to each other in the vicinity of the four corners at the opposing surfaces thereof by four support cylindrical columns 36, respectively, which extend in the forward/rearward direction (Z-direction). The front stationary support board 31 and the rear stationary support board 32 that are thus connected to each other are parallel to each other. The front stationary support board 31 is provided in a central portion thereof with a rectangular mounting hole (through-hole) 33 in which a transparent infrared-cut filter 34 having the same rectangular shape as the rectangular mounting hole 33 is fitted to be mounted thereto. As shown in FIG. 2, through-holes are formed in the front stationary support board 31 at three different positions, and three set screws 35 are inserted into the three through holes, respectively. The three set screws 35 are screwed into three female screw holes (not shown) formed on an inner surface of a camera body of the digital camera 20, so that the inclination angle of the front stationary support board 31 with respect to the camera body is adjusted by adjusting the amount of engagement of the three set screws 35 with the female screw holes.

The front stationary support board 31 is provided, on the rear surface thereof at four positions thereon, with four cylindrical support projections 38, respectively, which project rearward. A front half portion of each of four metal balls 44 is rotatably supported in a hemispherical recess (not shown)

formed in a rear end of each of the four cylindrical support projections 38, respectively. Four support projections 47 are formed on the rear stationary support board 32 at four positions thereon aligned with the four cylindrical support projections 38, respectively, so as to extend mutually towards each other, respectively, in the forward/rearward direction (Z-direction). A rear half portion of each of four metal balls 52 is rotatably supported in a hemispherical recess (not shown) formed in a front end of each of the four cylindrical support projections 47, respectively.

The camera shake correction apparatus 30 is provided, on the rear surface of the front stationary support board 31 at opposite ends thereof in the left/right direction, with two X-direction magnets MX which are secured to the rear surface of the front stationary support board 31 so that an S-pole and an N-pole of each X-direction magnet MX are aligned in the X-direction. The two X-direction magnets MX are aligned in the X-axis direction and the positions of the two X-direction magnets MX in the Y-axis direction are the same. Two X-direction magnetic circuits are formed between the two X-direction magnets MX and two portions of the rear stationary support board 32 which face the two X-direction magnets MX in the forward/rearward direction, respectively, due to the magnetic flux of the two X-direction magnets MX passing through the front stationary support board 31 and the rear stationary support board 32. Namely, the front stationary support board 31 and the rear stationary support board 32 function as yokes.

Figure 4:
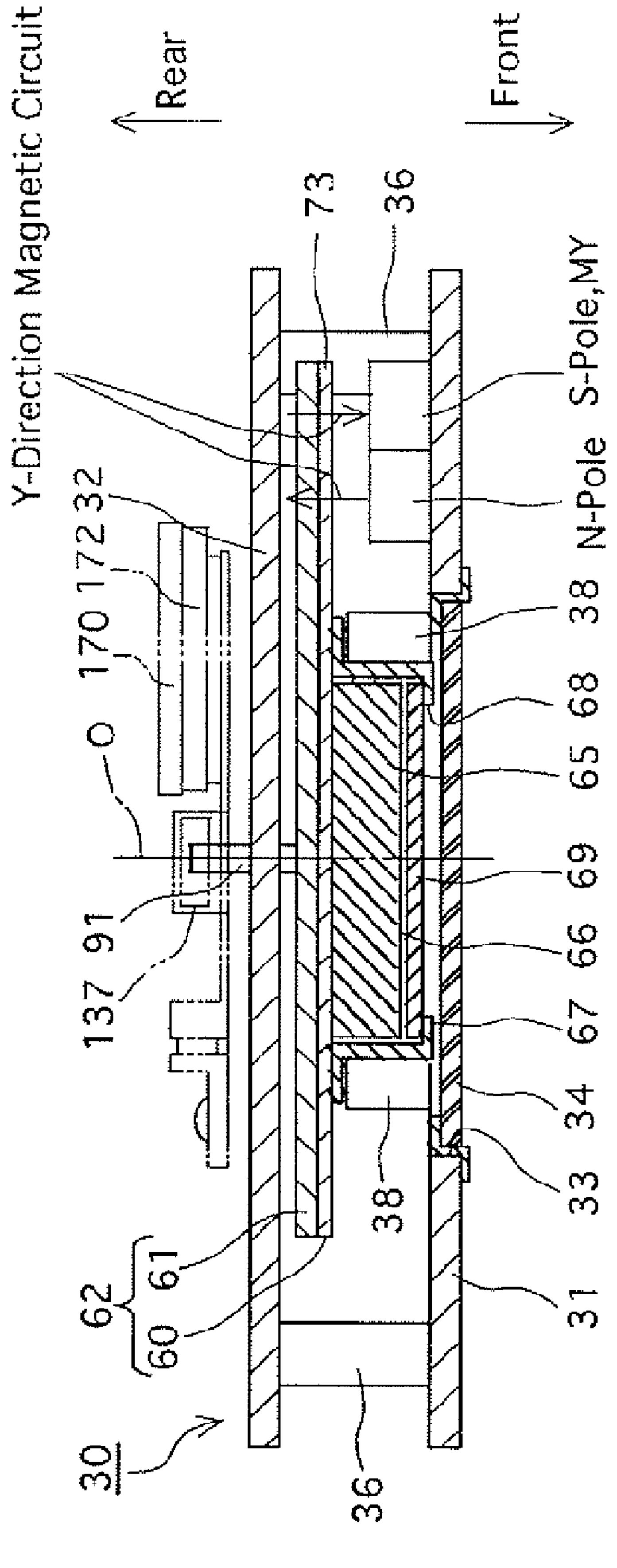
FIG. 4 is a cross sectional view of the camera-shake correction apparatus taken along the IV-IV line shown in FIG. 2.
Figure 5:
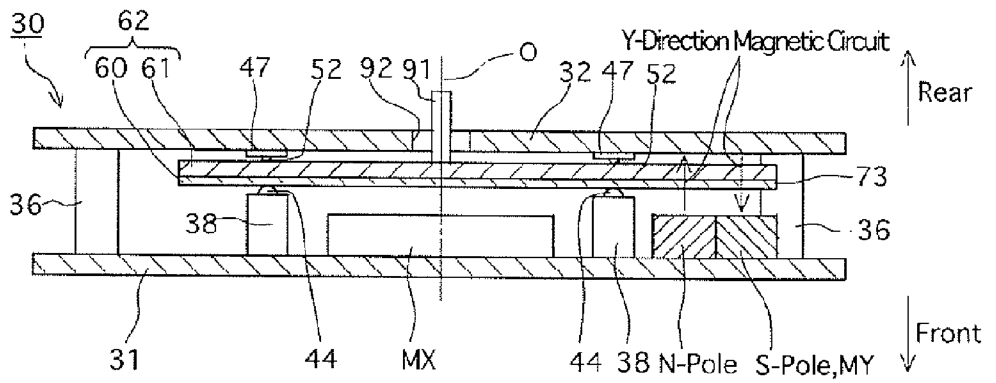
FIG. 5 is a cross sectional view of the camera-shake correction apparatus taken along the V-V line shown in FIG. 2.
Figure 6:
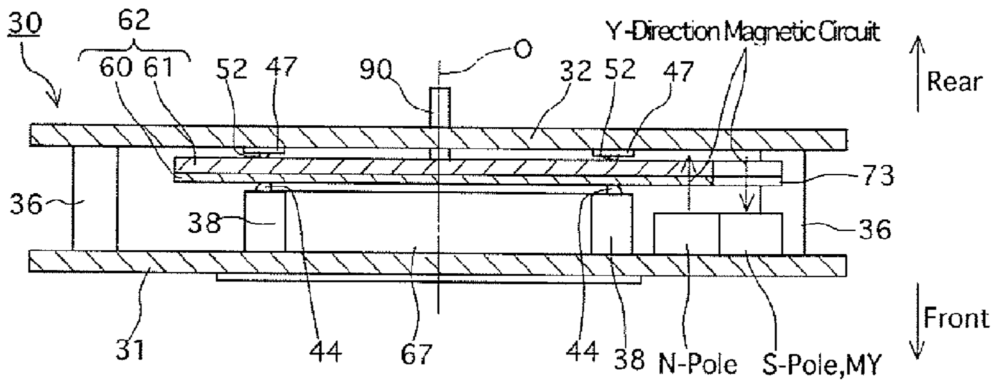
FIG. 6 is a cross sectional view of the camera-shake correction apparatus taken along the VI-VI line shown in FIG. 2.

The camera shake correction apparatus 30 is provided, on the rear surface of the front stationary support board 31 at a lower end thereof, with two Y-direction magnets (left and right Y-direction magnets) MY which are secured to the rear surface of the front stationary support board 31 so that an S-pole and an N-pole of each Y-direction magnet MY are aligned in the Y-direction. The two Y-direction magnets MY are aligned in the X-axis direction and the positions of the two Y-axis-direction magnets MY in the Y-axis direction are the same. As shown in FIGS. 4 through 6, two Y-axis-direction magnetic circuits are formed between the two Y-direction magnets MY and two portions of the rear stationary support board 32 which face the two Y-direction magnets MY in the forward/rearward direction, respectively, due to the magnetic flux of the two Y-direction magnets MY passing through the front stationary support board 31 and the rear stationary support board 32. Namely, the front stationary support board 31 and the rear stationary support board 32 function as yokes.

The camera shake correction apparatus 30 is provided with an electrical board 60, which is a flat rectangular board, and a reinforcing plate 61 having the same shape as the electrical board 60 as viewed from the front and is fixed to the back of the electrical board 60 to be integral therewith so that the electrical board 60 and the reinforcing plate 61 constitute a movable stage 62. As shown in FIGS. 3 through 6, the four metal balls 44 are in contact with the front surface of the electrical board 60 (i.e., the front surface of the movable stage 62) at four points to be freely rotatable thereat, and the four metal balls 52 are in contact with the rear surface of the reinforcing plate 61 (i.e., the rear surface on the movable stage 62) at four points to be freely rotatable thereat. In other words, the movable stage 62, which is constructed from the electrical board 60 and the reinforcing plate 61, is held between the four metal balls 44 and the four metal balls 52 in the forward/rearward position, and the movable stage 62 is provided orthogonal to the optical axis O of the optical system having the first, second and third lens groups L1, L2 and L3 (and the movable stage 62 is parallel to the front and rear stationary support boards 31 and 32).

Accordingly, the movable stage 62 is movable in an X-Y plane parallel to both the X-direction and the Y-direction (i.e., orthogonal to the optical axis O) relative to the front stationary support board 31 and the rear stationary support board 32 from the initial position shown in FIG. 2. In addition, the electrical board 60 (of the movable stage 62) and the front stationary support board 31 are provided with a common moving range limiting device (not shown) which limits the range of movement of the movable stage 62 relative to the front stationary support board 31 to a predetermined range of movement. For example, the common moving range limiting device can be constructed from holes provided in one of the movable stage 62 and the front stationary support board 31 and corresponding projections, which extend through the holes, provided in the other of the movable stage 62 and the front stationary support board 31.

A CCD (image pickup device) 65 is fixed to a front surface of the electrical board 60 at the center thereof. As shown in FIG. 2, the CCD 65 is in the shape of a rectangle as viewed from the front thereof. The CCD 65 is provided with a pair of X-direction edges (upper and lower X-direction edges) 65X which extend parallel to each other in the X-direction and a pair of Y-direction edges (right and left Y-direction edges) 65Y which extend parallel to each other in the Y-direction, in the state shown in FIG. 2 in which the electrical board 60 (movable stage 62) is in the initial position thereof.

A CCD holder 67 which surrounds the CCD 65 is fixed to the front of the electrical board 60 in an airtight fashion (dust-tight fashion). The CCD holder 67 is provided on a front wall thereof with an aperture 68 having a rectangular shape as viewed from the front of the camera shake correction apparatus 30. An optical low-pass filter 69 is installed in the internal space of the CCD holder 67 to be fixedly fitted therein between the front wall of the CCD holder 67 and the CCD 65. The space between the optical low-pass filter 69 and the front wall of the CCD holder 67 is maintained in an air-tight state. An imaging surface 66 of the CCD 65 faces the optical low-pass filter 69. The CCD 65, the optical low-pass filter 69, the aperture 68 and the infrared-cut filter 34 are aligned in the forward/rearward direction at all times. Object light which is passed through the lenses L1, L2 and L3, the infrared-cut filter 34 and the optical low-pass filter 69, is formed as an object image on the imaging surface 66 of the CCD 65. When the electrical board 60 (movable stage 62) is in the initial position (when the electrical board 60 is in the state shown in FIG. 2), the center of the imaging surface 66 of the CCD 65 is positioned on the optical axis O.

As shown in FIG. 2, the electrical board 60 is provided at horizontally opposite ends thereof with a right tongue portion 71 and a left tongue portion 72 which extend rightward and leftward, respectively, and is further provided at a lower end of the electrical board 60 with a lower tongue portion 73 which extends downward.

The right tongue portion 71 and the left tongue portion 72 are positioned to correspond to the aforementioned two X-direction magnetic circuits, respectively (i.e., positioned to face the two X-direction magnets MX in the forward/rearward direction, respectively).

Two planar X-direction drive coils CX having the same specifications are printed on the front surfaces of the right tongue portion 71 and the left tongue portion 72, respectively. The two X-direction drive coils CX lie in a plane parallel to an X-Y plane, are each wound in a coiled shape by over one hundred turns (i.e., are wound in both a direction parallel to the electrical board 60 and in a thickness direction of the electrical board 60), and are aligned in a direction parallel to the pair of X-direction edges 65X of the CCD 65 (in the X-direction in the state shown in FIG. 2). In other words, the positions of the two X-direction drive coils CX are coincident with each other in the direction parallel to the pair of Y-direction edges 65Y (in the Y-direction in the state shown in FIG. 2).

Accordingly, the two X-direction drive coils CX, the front stationary support board 31, the rear stationary support board 32, and the two X-direction magnets MX constitute an X-direction driving device.

As shown in FIGS. 4 through 6, the lower tongue portion 73 is positioned to correspond to the aforementioned two Y-direction magnetic circuits, respectively (i.e., positioned to face the two Y-direction magnets MY in the forward/rearward direction, respectively).

Two planar Y-direction drive coils CYA and CYB having the same specifications are printed on the front surface of the lower tongue portion 73. The two Y-direction drive coils CYA and CYB lie in a plane parallel to the X-Y plane, are each wound in a coiled shape by over one hundred turns (i.e., are wound in both a direction parallel to the electrical board 60 and in a thickness direction of the electrical board 60), and are aligned along the lower X-direction edge 65X of the CCD 65 (in the X-direction in the state shown in FIG. 2). In other words, the positions of the two Y-direction drive coils CYA and CYB are coincident with each other in the direction parallel to the pair of Y-direction edges 65Y (in the Y-direction in the state shown in FIG. 2).

Accordingly, the two Y-direction drive coils CYA and CYB, the front stationary support board 31, the rear stationary support board 32, and the two Y-direction magnets MY constitute an Y-direction driving device.

The two X-direction drive coils CX, and the two Y-direction drive coils CYA and CYA are electrically connected to a controller constructed from a CPU, etc., provided inside the digital camera 20.

The camera-shake correction apparatus 30 carries out camera-shake (hand-shake) correction operations via the controller supplying electric current to the two X-direction drive coils CX, and the two Y-direction drive coils CYA and CYB.

In other words, if electric current is supplied to the X-direction drive coils CX, a linear drive force in either direction FX1 or direction FX2 occurs in the X-direction drive coils CX, as shown in FIG. 2. Similarly, if electric current is supplied to the Y-direction drive coils CYA and CYB, a linear drive force in the either direction FXY or direction FY2 occurs in the Y-direction drive coils CYA and CYB.

As is commonly known in the art, when a camera body is shaked/vibrated in the X-direction or the Y-direction due to hand-shake (camera shake), the amount of movement of the camera body (amount of hand-shake) in the X-direction and the Y-direction is detected, and if the CCD 65 is linearly moved with respect to the camera body by the same amount as the detected amount of hand-shake but in the opposite direction, the hand-shake (camera-shake/image-shake) of the CCD 65 is corrected. Accordingly, in order for the CCD 65 to be linearly moved in such a manner, if electric current is supplied from the controller to the two X-direction drive coils CX, and the two Y-direction drive coils CYA and CYB, camera-shake applied to the CCD 65 in the X-direction and Y-direction is corrected.

Furthermore, since the movable stage 62 (CCD 65) is relatively rotatable with respect to the front stationary support board 31 and the rear stationary support board 32, if the direction of the electric current supplied to the Y-direction drive coil CYA and the Y-direction drive coil CYB are made mutually opposite, so that mutually opposite driving forces occur between the Y-direction drive coil CYA and the Y-direction drive coil CYB, the movable stage 62 (CCD 65) is rotated. Accordingly, if electric current is supplied from the controller to the Y-direction drive coil CYA and the Y-direction drive coil CYB so that the movable stage 62 (CCD 65) is rotated in a rotational direction opposite to the rotational direction of the camera shake, rotational camera-shake can be corrected.

The lock mechanism 100 to which the present invention is applied and is installed in the camera-shake correction apparatus 30 will be described hereinafter with reference to FIGS. 2 through 12.

Figure 3:
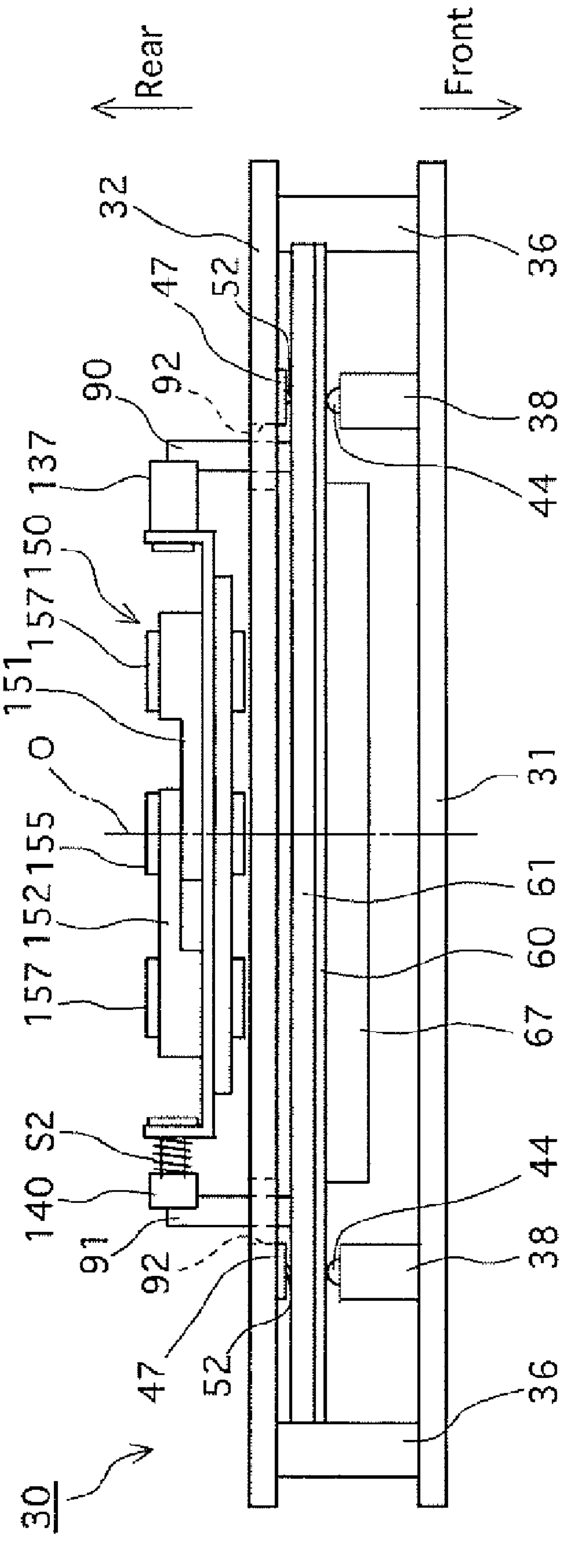
FIG. 3 is a plan view of the camera-shake correction apparatus, as viewed in the direction of the arrow III shown FIG. 2.

As shown in FIGS. 2 through 4, engaging pins (engaging members) 90 and 91 are provided on the back surface of the reinforcing plate 61 of the movable stage 62 so as to project rewards therefrom and so as to be aligned on the X-direction line LX which passes through the center of gravity of an integral movable body which includes the movable stage 62 and other members integral therewith (the CCD 65, the CCD bolder 67, engaging pins 90 and 91, etc.) and are provided at symmetrical positions with respect to a Y-direction line LY with passes through the center of gravity of the integral movable body, with the camera-shake correction apparatus 30 in the initial state shown in FIG. 2. Furthermore, the rear stationary support board 32 is provided with insertion holes (through-holes) 92 which are likewise formed at positions symmetrical to the Y-direction line LY and aligned on the X-direction line LX, i.e., are formed at positions corresponding to the engaging pins 90 and 91. The engaging pins 90 and 91 are inserted through the insertion holes 92, respectively, so as to extend therethrough so that the rear end portions of the engaging pins 90 and 91 project rearwards from the rear stationary support board 32.

A front yoke 101 which is made from a soft magnetic material such as metal is fixed to the center portion of the rear surface on the rear stationary support board 32 with four mounting screws 102. A pair of upper and lower screw holes 103 and a pair of upper and lower screw holes 104, each aligned vertically (in the Y-direction), are formed on left and right sides of the front yoke 101, respectively, and a pair of left screw holes 105 and a pair of right screw holes 106 are formed on left and right sides of the front yoke 101, each aligned horizontally, respectively. A cut-out portion 107 is formed at the lower edge portion of the front yoke 101, and a guide cut-out portion 108 is formed from the upper edge of the cut-out portion 107 and extends upwards in the Y-direction. Furthermore, the front yoke 101 is provided with left and right guide slots 109 formed on left and right sides of thereof below the left and right pairs of screw holes 105 and 106, respectively, and extend in the X-direction.

A Y-direction slide plate 110, which has an approximate T-shape, is provided behind the front yoke 101 and is slidable in the Y-direction in a plane parallel to the front yoke 101. The Y-direction slide plate 110 has left and right guide slots (through-slots) 111 formed at left and right sides therein and extend in the Y-direction Amounting screw 112 and a mounting screw 116 are inserted in each of the guide slots 111 so that the left mount screws 112 and 116 are screw-engaged with the upper and lower screw holes 104 of the front yoke 101, and the right mounting screws 112 and 116 are screw-engaged with the upper and lower screw holes 103 of the front yoke 101.

The mounting screws 112 are each provided with a disc-shaped portion 113 having a larger diameter than the width of each guide slot 111 in the X-direction, and the mounting screws 116 are each provided with round head portion 117 having a larger diameter than the width of each guide slot 111 in the X-direction. The disc-shaped portions 113 of the mounting screws 112 and the round head portions 117 of the mounting screws 116 are in contact with the rear surface of the Y-direction slide plate 110 so that the disc-shaped portions 113 and the round head portions 117 always cause the Y-direction slide plate 110 to abut against the front yoke 101.

Figure 8:
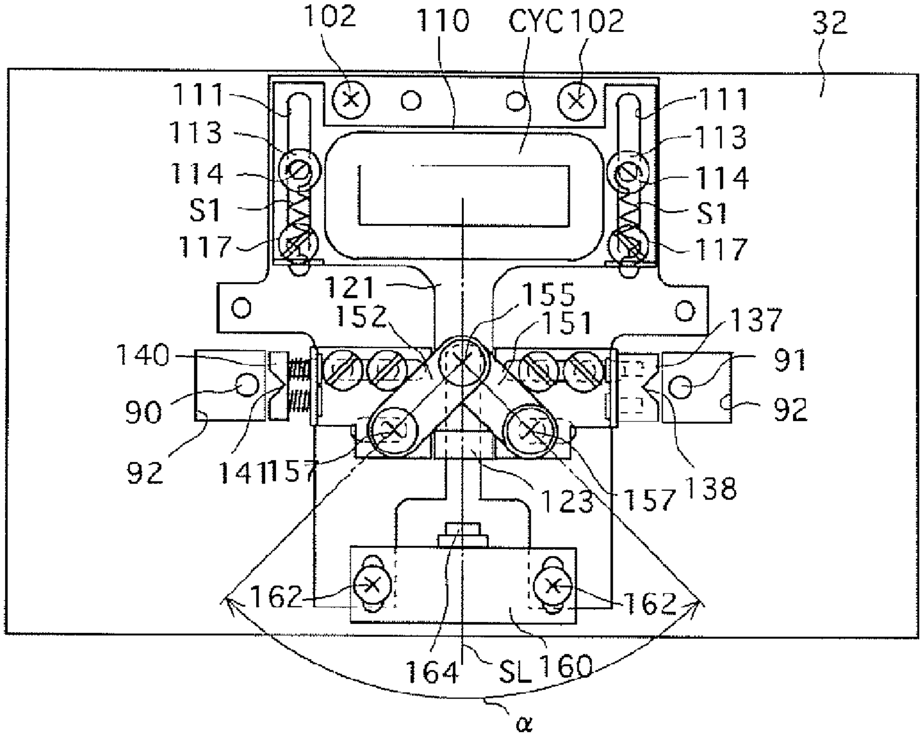
FIG. 8 is a rear view of the lock mechanism of the first embodiment in a disengaged state, with a rear yoke omitted for clarity.
Figure 9:
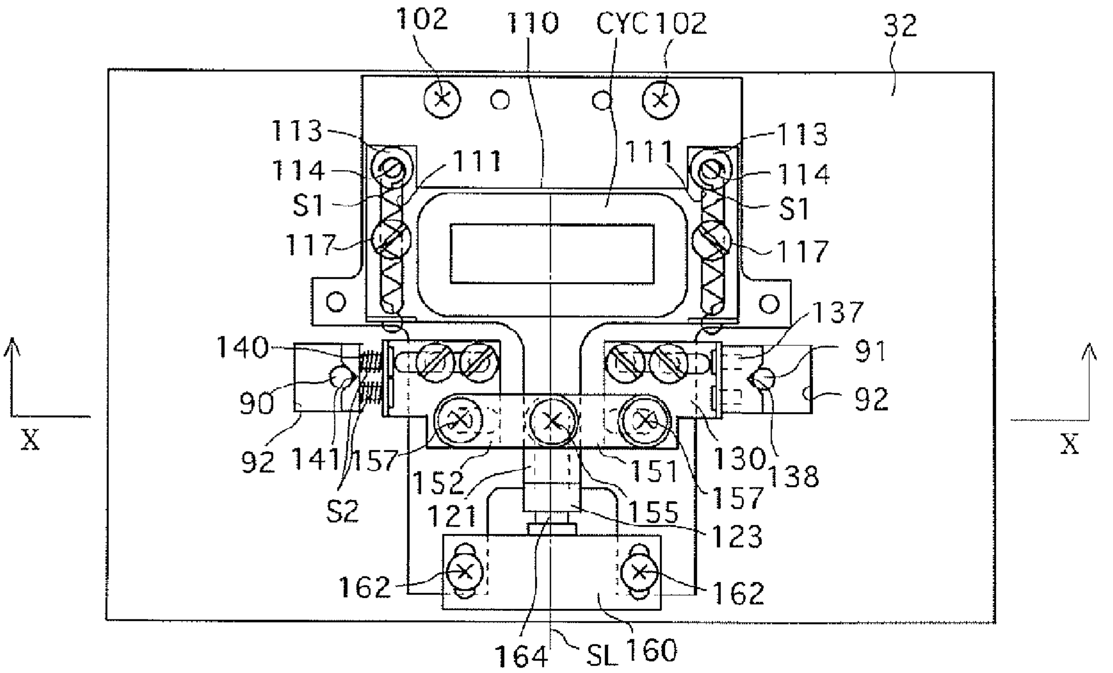
FIG. 9 is a rear view of the lock mechanism of the first embodiment in an engaged state, with the rear yoke omitted for clarity.
Figure 10:
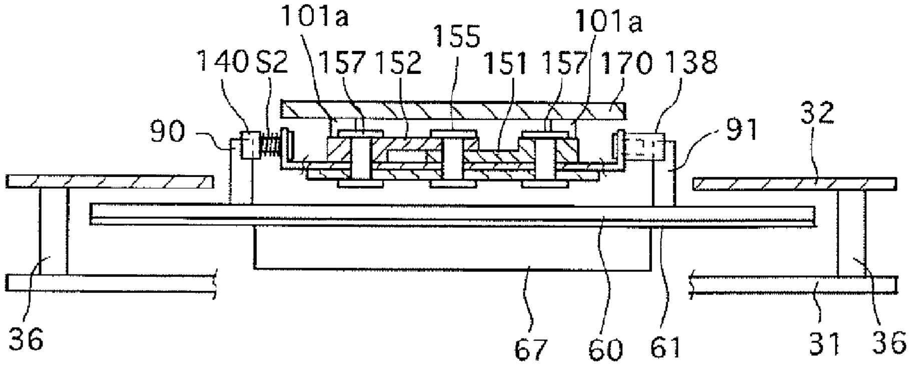
FIG. 10 is a cross section view of the lock mechanism taken along the X-X shown in FIG. 9.

Hence, the Y-direction slide plate 110 is relatively slidable in the Y-direction with respect to the front yoke 101 due the engaging relationship between the mounting screws 112 and 116 and the guide slots 111, so that the Y-direction slide plate 110 can be moved between a disengaged position shown in FIG. 8 and an engaged position shown in FIG. 9. In addition, spring-hook projections 114 are provided on the rear sides of the disc-shaped portions 113, respectively, so as to project rearwards therefrom. A pair of left and right rearward-bent pieces 118 are provided at left and right ends of the Y-direction slide plate 110 so as to extend rearwards, and a spring-connection hole 119 is formed in each of the left and right rearward-bent pieces 118. The ends of left and right extension springs (unlock driving device/biasing device/second retaining device) S1 are engaged (connected) with the respective left and right spring-hook projections 114 and with the respective spring-connection holes 119. The extension springs S1 always bias the Y-direction slide plate 110 so as to move toward to the disengaged position.

A Y-direction drive coil CYC is fixed to the rear surface of the Y-direction slide plate 110. The Y-direction drive coil CYC lies in a plane parallel to an X-Y plane and is wound in a coiled shape by over one hundred turns (i.e., is wound in both a direction parallel to the Y-direction slide plate 110 and in a thickness direction of the Y-direction slide plate 110). The Y-direction slide plate 110 is provided with a downward-extending portion (first link member) 121 which extends downwards from a central portion thereof in the Y-direction, and always overlaps the guide cut-out portion 108 of the front yoke 101 in the Z-direction. Furthermore, a round through-hole 122 is formed in a central portion of the downward-extending portion 121, and a magnetic plate (first retaining device) 123, made from metal, etc., is fixed to the lower end portion of the down-extending portion 121 on the rear surface thereof.

The lock mechanism 100 is provided with left and right X-direction slide members 130 which are slidable in the X-direction with respect to the front yoke 101. Each of the left and right X-direction slide members 130 has an L-shaped cross-section and is provided with a base piece 131 which is parallel with the front yoke 101. The base pieces 131 are each provided with X-direction guide through-slots 133 and two through-holes 134. Left and right pairs of mounting screws 135 are inserted through each respective left and right guide through-slots 133 so as to be screw engaged with the left screw holes 105 and the right screw holes 106, respectively. Accordingly, the left and right X-direction slide members 130 are slidable in the X-direction relative to the front yoke 101 via the engagement relationship between the left and right pairs of mounting screws 135 and the left and right X-direction guide through-slots 133, respectively.

The left and right X-direction slide members 130 have respective left and right rearward-bent pieces 136, which are bent rearwards in the Z-direction. A lock member 137, made from a compound resin, is fixed to a right surface of the right rearward-bent piece 136 of the right X-direction slide member 130. A V-shaped lock-engaging groove 138 is formed on the right surface (outer surface) of the lock member 137. The V-shaped lock-engaging groove 138 is engageable and disengageable with the engaging pin 91.

A pair of flat-head pins 139 are inserted through a pair of through-holes (not shown) formed in the left rearward-bent piece 136 of the left X-direction slide member 130 so that the pair of flat-head pins 139 are relatively moveable through the pair of through holes. The ends of the flat-head pins 139 are fixed to a lock member 140, which is made from a compound resin. Hence, the lock member 140 is provided on the left side (outer side) of the left rearward-bent piece 136. A V-shaped lock-engaging groove 141 is formed on the left surface (outer surface) of the lock member 140. The V-shaped lock-engaging groove 141 is engageable and disengageable with the engaging pin 90. Furthermore, compression springs S2 are provided over the pair of flat-head pins 139, respectively, in between facing surfaces of the lock member 140 and the rearward-bent piece 136 of the left X-direction slide member 130. Accordingly, the lock member 140 is always biased by the compression springs S2 in a direction away from the left rearward-bent piece 136 of the left X-direction slide member 130.

The Y-direction slide plate 110 and the left and right X-direction slide members 130 are interconnected via a V-link mechanism 150. The V-link mechanism 150 includes a linear link member (second link member) 151 and a linear link member (second link member) 152 which have the same length. A recessed portion 153 is formed in a left half portion of the rear surface of the link member 151, and a recessed portion 154 is formed in a right half portion of the front surface of the link member 152. The recessed portions 153 and 154 mutually abut against each other. A rotatable mounting pin (first rotational axis) 155 which is rotatably inserted through a rotational mounting hole 152*a* formed in a right end portion of the linear link member 152 and a rotational mounting hole 151*a* formed in a left end portion of the linear link member 151, in a direction parallel to the optical axis O, is inserted through the round through-hole 122 so as to be relatively rotatable thereto. The end portion of the rotatable mounting pin 155 is slidably engaged into the guide cut-out portion 108. An E-ring 156 positioned at the front side of the front yoke 101 is lock-engaged into a ring groove provided at the end portion of the rotatable mounting pin 155. Hence, the rotatable mounting pin 155 is prevented from coming out of the rotational mounting holes 151*a* and 152*a*, the round through-hole 122, and the guide cut-out portion 108, due to the E-ring 156. Furthermore, a pair of rotatable mounting pins (second rotational axes) 157 which extend in a direction parallel with the rotatable mount pin 155 so as to be inserted through a rotational mounting hole 151*b* formed in the right end portion of the linear link member 151 and a rotational mounting hole 152*b* formed in the left end portion of the linear link member 152, respectively, extend through left and right through-holes 134 and left and right guide slots 109, respectively. E-rings 158 positioned on the front side of the front yoke 101 are lock-engaged into ring grooves provided at the end portions of the rotatable mounting pins 157, respectively. Hence, the rotatable mounting pins 157 are prevented from coming out of the rotational mounting holes 151*b* and 152*b*, the left and right through-holes 134, and the left and right guide slots 109 due to the E-rings 158, respectively.

Link members 151 and 152 of the V-link mechanism 150 move so that the shape of the V-link mechanism 150 changes while always maintaining a bilaterally symmetrical shape with respect to a Y-direction straight reference line SL (see FIGS. 8 and 9) which passes through the center of the rotatable mounting pin 155 which is positioned at an intermediate position between the lock members 140 and 137 (the distance between the rotatable mounting pin 155 and the left and right rotatable mounting pins 157 is the same, and the left and right rotatable mounting pins 157 are always positioned at bilaterally symmetrical positions with respect to the Y-direction straight reference line SL).

Specifically, when the Y-direction slide plate 110 is positioned at the disengaged position shown in FIG. 8, the link members 151 and 152 are positioned at the disengaged position so that the V-link mechanism 150 is in a V-shape, as viewed from the front thereof. In this state, the lock members 140 and 137 are positioned in the disengaged position inwards and away from the engaging pins 90 and 91, respectively. Conversely, when the Y-direction slide plate 110 is positioned at the engaged position shown in FIG. 9, the link members 151 and 152 move to the engaged position so that the axial lines thereof are aligned with each other in a straight line in the X-direction, as viewed from the front thereof, so that the lock members 140 and 137 are positioned in the engaged position, engaged with the engaging pins 90 and 91, respectively. In this state, if the movable stage 62 is in the initial position shown in FIG. 2, the V-shaped lock-engaging groove 138 of the lock member 137 engages with the engaging pin 91, and the V-shaped lock-engaging groove 141 of the lock member 140 engages with engaging pin 90, as shown in FIG. 9. Accordingly, when the V-shaped lock-engaging groove 141 and the V-shaped lock-engaging groove 138 linearly move from an inner position to an outer position so as to engage with the left and right engaging pins 90 and 91, respectively, the movable stage 62 is locked in the initial position shown FIG. 2 and cannot move.

The lock mechanism 100 is provided with an attachment plate 160 having Y-direction through-slots 161 formed at left and right end portions thereof. A pair of mounting screws 162 are respectively inserted through the left and right Y-direction through-slots 161 and are respectively screw-engaged into a pair of screw holes 163 formed in the front yoke 101 at left and right sides of the cut-out portion 107, so that the attachment plate 160 is fixed to a lower portion of the front yoke 101 thereby. A permanent magnet (first retaining device) 164 is fixed to the upper surface of the attachment plate 160 at the center portion thereof. The permanent magnet 164 retains (holds) the Y-direction slide plate 110 and the link members 151 and 152 in the engaged position by magnetically attracting the magnetic plate 123 so as to contact the permanent magnet 164 when the Y-direction slide plate 110 and the link members 151 and 152 have been moved to the engaged position. Moreover, the permanent magnet 164 holds the lock members 140 and 137 in the engaged position.

Figure 7:
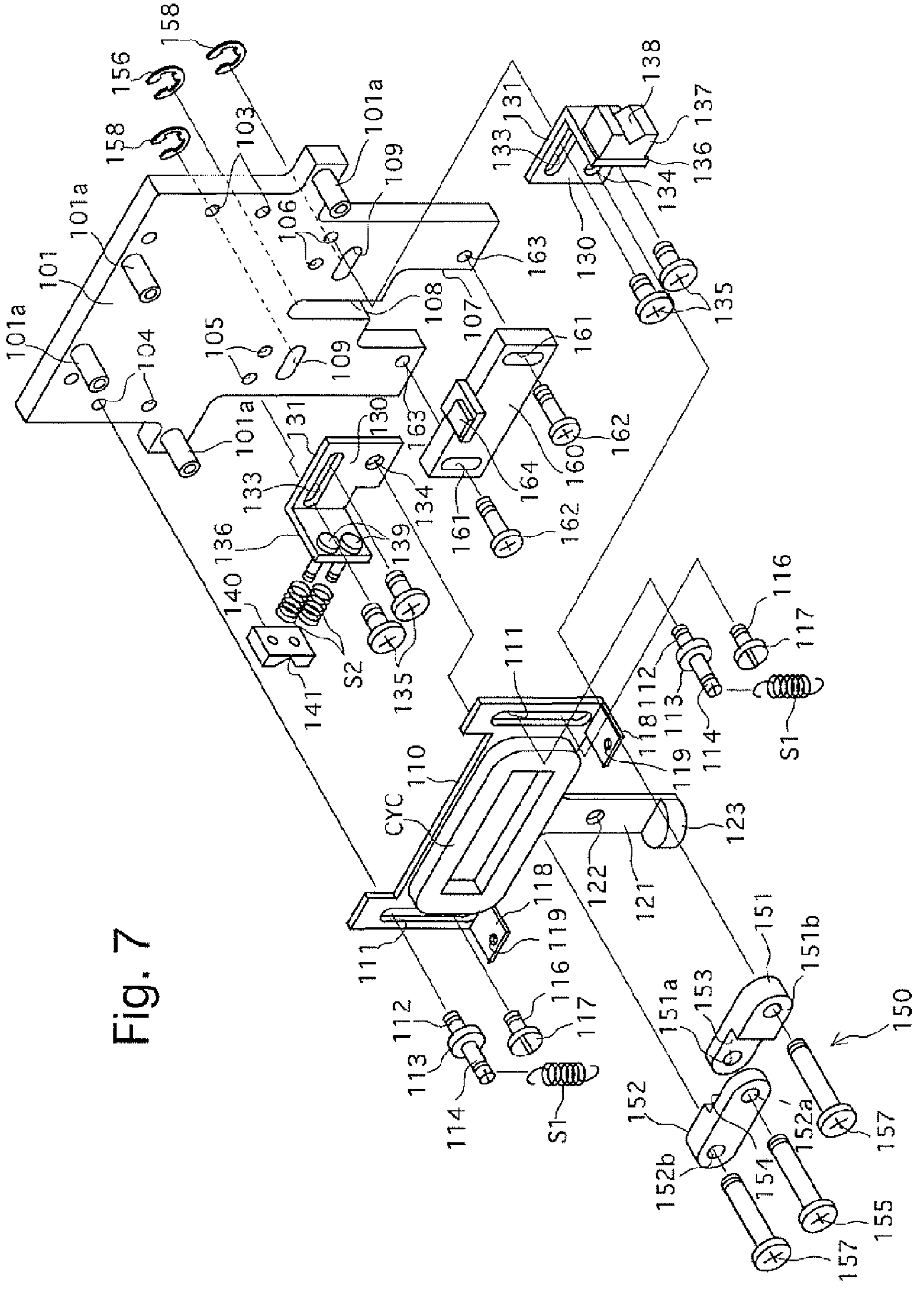
FIG. 7 is an exploded perspective view of the first embodiment of a lock mechanism, according to the present invention, in which some members thereof omitted for clarity.

As shown in FIG. 7, the upper half portion of the front yoke 101 is provided, on the rear surface thereof at four positions thereon, with four cylindrical support projections 101*a*. A rear yoke 170, which is made from a magnetic material such as soft iron, is fixed to the rear surfaces of the four cylindrical support projections 101*a* with four mounting screws 171, respectively. The front and rear yokes 101 and 170 extend mutually parallel to each other.

Figure 11:
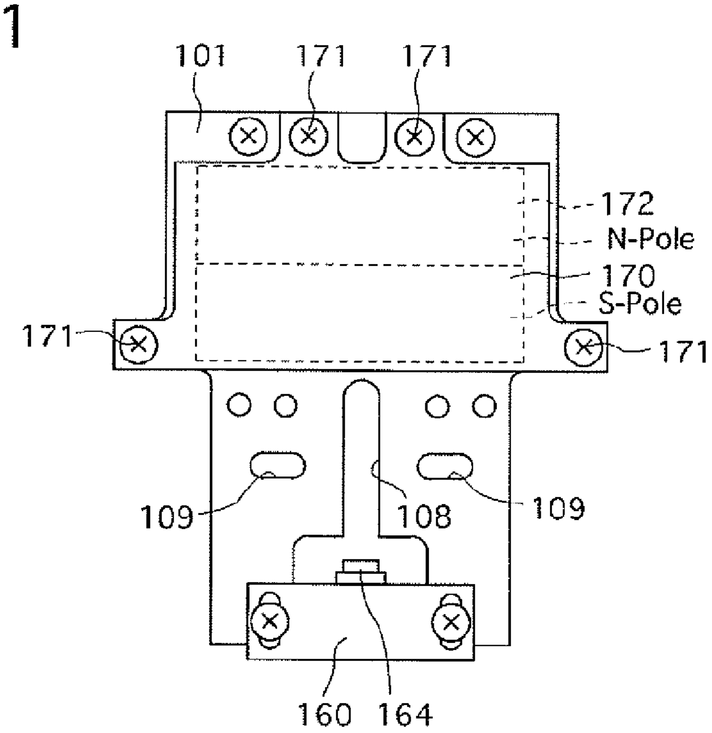
FIG. 11 is a rear view showing the rear yoke and a front yoke.
Figure 12:
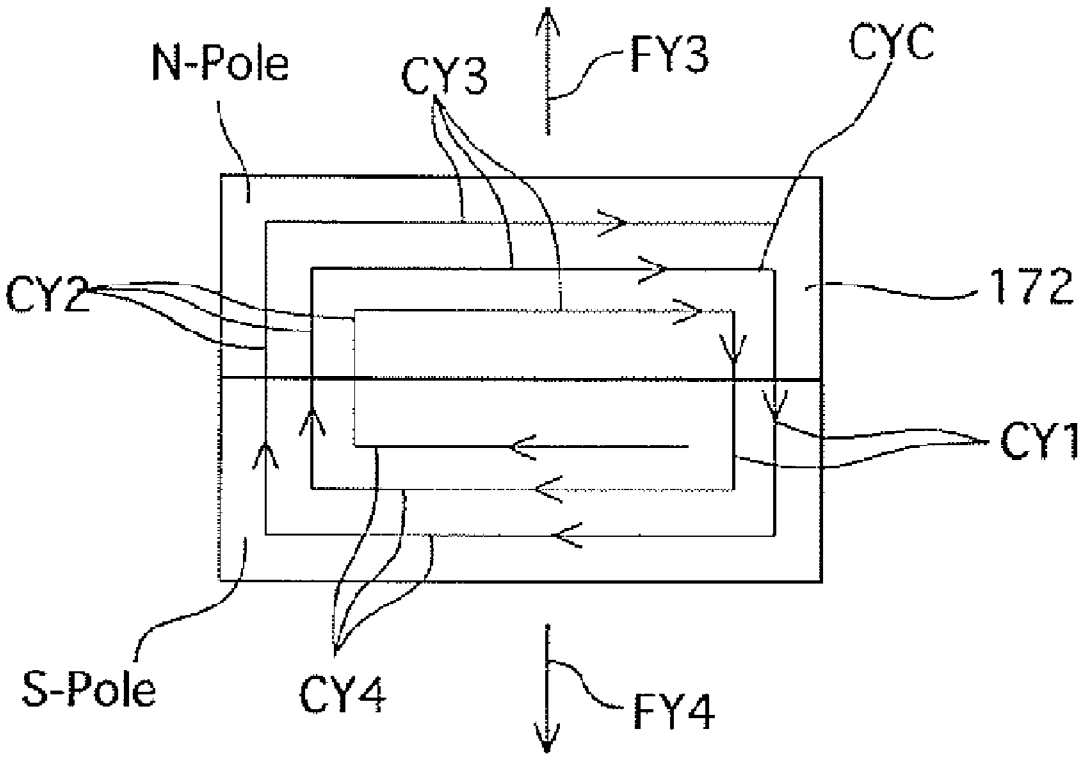
FIG. 12 is an enlarged schematic view of major elements of a drive device of the lock mechanism.
Figure 13:
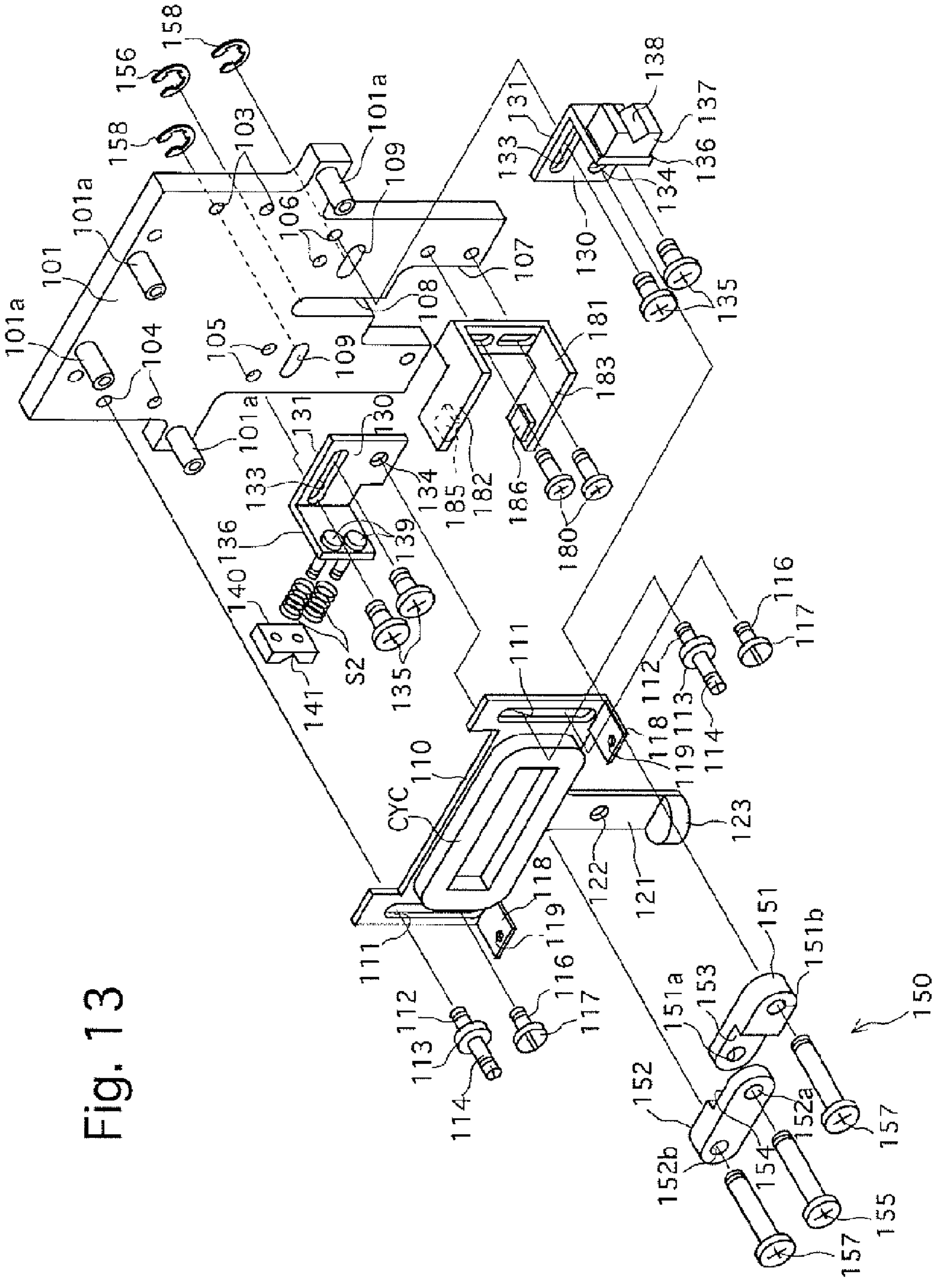
FIG. 13 is an exploded perspective view of a second embodiment of a lock mechanism, according to the present invention, in which some members thereof omitted for clarity.

A permanent magnet 172 is fixed to the front surface of the rear yoke 170 so as to face the Y-direction drive coil CYC. As shown in FIGS. 11 and 12, a N-pole and a S-pole of the permanent magnet 172 are aligned in the Y-direction. A magnetic circuit is formed between facing portions of the permanent magnet 172 and the front yoke 101 by the front yoke 101 and the rear yoke 170 being magnetic flux of the permanent magnet 172 passing through, and the Y-direction drive coil CYC is positioned within this magnetic circuit. As shown in FIG. 12, linear upper sides CY3 of the Y-direction drive coil CYC are aligned with the N-pole of the permanent magnet 172 in the Z-direction, the linear lower sides CY4 of the Y-direction drive coil CYC are aligned with the S-pole of the permanent magnet 172 in the Z-direction, and this alignment relationship (overlapping relationship) is always maintained regardless of the position of the Y-direction slide plate 110.

The front yoke 101, the rear yoke 170, the permanent magnet 172, and the Y-direction drive coil CYC constitute a lock driving device. Furthermore, the front yoke 101, the rear yoke 170 and the permanent magnet 172 constitute a magnetic-force generator.

The operation of the above-described lock mechanism 100 will be described hereinafter.

The Y-direction drive coil CYC is electrically connected with the aforementioned controller provided inside the digital camera 20.

When a camera-shake correction switch SW (shown in FIG. 1), provided on the camera body, is OFF, the movable stage 62 is at the initial position (non-operational state) as shown in FIG. 2, and the controller does not supply any electric current to the Y-direction drive coil CYC. As shown in FIG. 9, the V-shaped lock-engaging groove 141 of the lock member 140 and the V-shaped engaging groove 138 of the lock member 137 are lock-engaged with the engaging pins 90 and 91, respectively, in the engaged position so that the engaging pins 90 and 91 are locked and the movable stage 62 is maintained at the initial position shown in FIG. 2. Furthermore, since the magnetic plate 123 is magnetically attracted to the permanent magnetic 164 so as to be in contact therewith, the lock members 140 and 137 are retained (held) at the engaged position.

In this engaged position, if the camera-shake correction switch SW is turned ON, electric current is instantaneously supplied from the controller to the Y-direction drive coil CYC in the direction shown in FIG. 12, and an instantaneous linear drive force in a direction FY3 occurs in the Y-direction drive coil CYC as shown in FIG. 12. Accordingly, since this linear drive force is larger than the magnetic attractive force between the magnetic plate 123 and the permanent magnetic 164, the Y-direction slide plate 110 is moved upwards, and the magnetically-attractive contact between the magnetic plate 123 and the permanent magnetic 164 is released. Accordingly, the Y-direction slide plate 110 and the link members 151 and 152 are moved to the disengaged position (see FIG. 8) due to the tension of the left and right extension springs S1 (which constitutes an unlock driving device). Furthermore, the lock members 140 and 137 are moved inwards away from the engaging pins 90 and 91, respectively, so that the engaging pins 90 and 91 are unlocked. Accordingly, the movable stage 62 and the CCD 65 enter an operational state in which a camera-shake correction operation can be carried out thereon.

Since the biasing force of the extension springs (second retaining device) S1 is also exerted on the Y-direction slide plate 110 after the Y-direction slide plate 110 and the link members 150 and 151 have moved to the disengaged position, the Y-direction slide plate 110 and the link members 150 and 151 are held (retained) at the disengaged position.

Upon the camera-shake correction operation being completed whereby the camera-shake correction switch is turned OFF, the controller supplies electric current to the two X-direction drive coils CX and the two Y-directions drive coils CYA and CYB, so that the movable stage 62 is returned to the initial position (non-operational state) as shown in FIG. 2. Furthermore, since electric current is supplied from the controller to the Y-direction drive coil CYC in a direction opposite to that shown by the arrows in FIG. 12, a linear drive force in a direction FY4 occurs in the Y-direction drive coil CYC, as shown in FIG. 12. Since this linear drive force in the direction FY4 is larger than the biasing force of the extension springs S1, the Y-direction slide plate 110 moves downward so that the Y-direction slide plate 110 and the link members 151 and 152 move from the disengaged position (FIG. 8) to the engaged position (FIG. 9). Furthermore, the lock members 140 and 137 are moved from the disengaged position to the engaged position so that the V-shaped lock-engaging groove 141 of the lock member 140 re-engages with the engaging pin 90, and the V-shaped lock-engaging groove 138 of the lock member 137 re-engages with engaging pin 91, to thereby lock the engaging pins 90 and 91. Therefore, the movable stage 62 and the CCD 65 are in the initial position in a state where a camera-shake correction operation cannot be carried out.

When the Y-direction slide plate 110 and the link members 151 and 152 reach the engaged position, since supply of electric current from the controller to the Y-direction drive coil CYC is stopped, and the magnetic plate 123 and the permanent magnet 164 are magnetically attracted so as to contact each other, the Y-direction slide plate 110 and the link members 151 and 152 are held (retained) at the engaged position (FIG. 9).

According to the above description of the first embodiment of the present invention, the engaging pins 90 and 91 can be securely locked in a short amount of time.

Furthermore, compared to the prior art in which one boss (engaging pin) is clasped and locked by abutting members (lock members), a firmer (stronger) locking state can be achieved with the lock mechanism 100 of the present invention using the same driving force.

Furthermore, since the movable stage 62 (CCD 65) is rotatable relative to the front stationary support board 31 and the rear stationary support board 32, if only one lock pin (engaging pin) were to he provided as in the prior art, even if the lock pin were to be locked by lock members, rotation of the movable stage 62 (CCD 65) could not be prevented. However, if a construction is provided like that of the first embodiment of present invention in which a pair of engaging pins (the engaging pins 90 and 91) are locked by a pair of lock members (the pair of lock members 140 and 137), rotation of the movable stage 62 (CCD 65) can be prevented, and hence, the lock mechanism 100 demonstrates a special benefit when applied a camera-shake correction apparatus (camera-shake correction apparatus 30) in which rotational camera-shake can be corrected.

In addition, when the lock mechanism 100 is locked and unlocked, since the lock members 140 and 137 are immovably held (retained) at the engaged position and the disengaged position, respectively, using magnetic force and the biasing force of the extension springs S1, electrical power consumption can be drastically reduced compared to the case where the retaining and moving of the lock members 140 and 137 are solely carried out electrically.

Furthermore, no force is exerted from the lock members 140 and 137 on the engaging pins 90 and 91, respectively, in the direction of the optical axis O during a locking operation. Accordingly, the CCD 65 does not move in the optical axis O direction and no adverse effect on the focus state of the CCD 65 occurs during a locking operation.

Furthermore, since the linear drive force occurring in the Y-direction drive coil CYC is transferred to the lock members 140 and 137 via utilization of the V-link mechanism 150, it is possible to securely lock the engaging pins 90 and 91 with a large force. Namely, as shown in the following expression (1), when a linear force A is applied downwards on the Y-direction slide plate 110, the movement force B in the left and right directions which occurs in the link members 151 and 152 is:

$$B=A/\tan(90-\alpha/2) \quad (1)$$

wherein 'α' designates the opening angle between the link members 151 and 152, as shown in FIG. 8.

Accordingly, as shown in FIG. 8, when the V-link mechanism 150 is in the disengaged position (with the link members 151 and 152 opened at an angle α of 90°), the movement force B which occurs in the link members 151 and 152 in the left and right directions is A/2. However, as shown in FIG. 9, when the V-link mechanism 150 has reached the engaged position (with the link members 151 and 152 opened at the angle α of 180°), movement force B which occurs in the link members 151 and 152 in the left and right directions is greater than A. Accordingly, it is possible for the engaging pins 90 and 91 to be locked by a force larger than the linear drive force occurring in the Y-direction drive coil CYC, so that the movable stage 62 (CCD 65) can be securely locked at the initial position shown in FIG. 2.

Furthermore, since the Y-direction slide plate 110, the V-link mechanism 150, the X-direction slide members 130, and the lock members 140 and 137 are all positioned in between the engaging pins 90 and 91, the lock mechanism 100 can be miniaturized.

Furthermore, since the V-link mechanism 150 is simple in structure, it is possible to reduce the manufacturing costs of the lock mechanism 100, and since the lock mechanism 100 is simple in structure, the lock mechanism 100 has superior durability.

Since the pair of flat-head pins 139 are movable (adjustable) in the X-direction relative to the left X-direction slide member 130, and the compression springs S2 are provided over the pair of flat-head pins 139, respectively, between the left rearward-bent piece 136 and the lock member 140, even if manufacturing/assembly error occurs in the relative positions of the engaging pin 90 and the lock member 140, such error can be taken up (absorbed) by the lock member 140 and the compression springs S2. Namely, the lock member 140 and the compression springs S2 constitute a resilient member. Therefore, even it such manufacturing/assembly error occurs, the engaging pins 90 and 91 can still be securely locked by the V-shaped lock-engaging grooves 141 and 138 of the arm members 140 and 137, respectively, due to the lock member 140 resiliently engaging with the engaging pin 90.

Furthermore, since the V-shaped lock-engaging grooves 141 and 138 have a V cross-sectional shaper when the V-shaped lock-engaging grooves 141 and 138 engage with the engaging pins 90 and 91, respectively, the engaging pins 90 and 91 are automatically moved into the base portions of the V-shaped lock-engaging grooves 141 and 137. Hence, the engaging pins 90 and 91 can be securely and smoothly engaged into the V-shaped lock-engaging grooves 141 and 137.

A second embodiment of the present invention will be described hereinafter with reference to FIGS. 13 through 17. Note that in the second embodiment, the digital camera 20 and the structure of the camera-shake correction apparatus 30 are the same as the first embodiment, and since the lock mechanism 100 of the second embodiment is similar to that of the first embodiment, like members are designated with like numerals and detailed descriptions of such members are omitted.

In the second embodiment, the lower end portion of the front yoke 101 is provided with an attachment member 181 fixed thereto via a pair of upper and lower mounting screws 180. The attachment member 181 is provided with an upper plate 182 and a lower plate 183 which extend rearwards and are parallel to each other. The upper plate 182 is provided on the lower surface thereof with a permanent magnet (second retaining device) 185, and the lower plate 183 is provided on the upper surface thereof with a permanent magnet (first retaining device) 186. The downward-extending portion 121 is positioned in a space provided between the front edges of the upper plate 182 and the lower plate 183 and the rear surface of the front yoke 101, so that the magnetic plate 123, provided on the end of the downward-extending portion 121 on the rear surface thereof, is positioned in between the permanent magnets 185 and 186.

Figure 14:
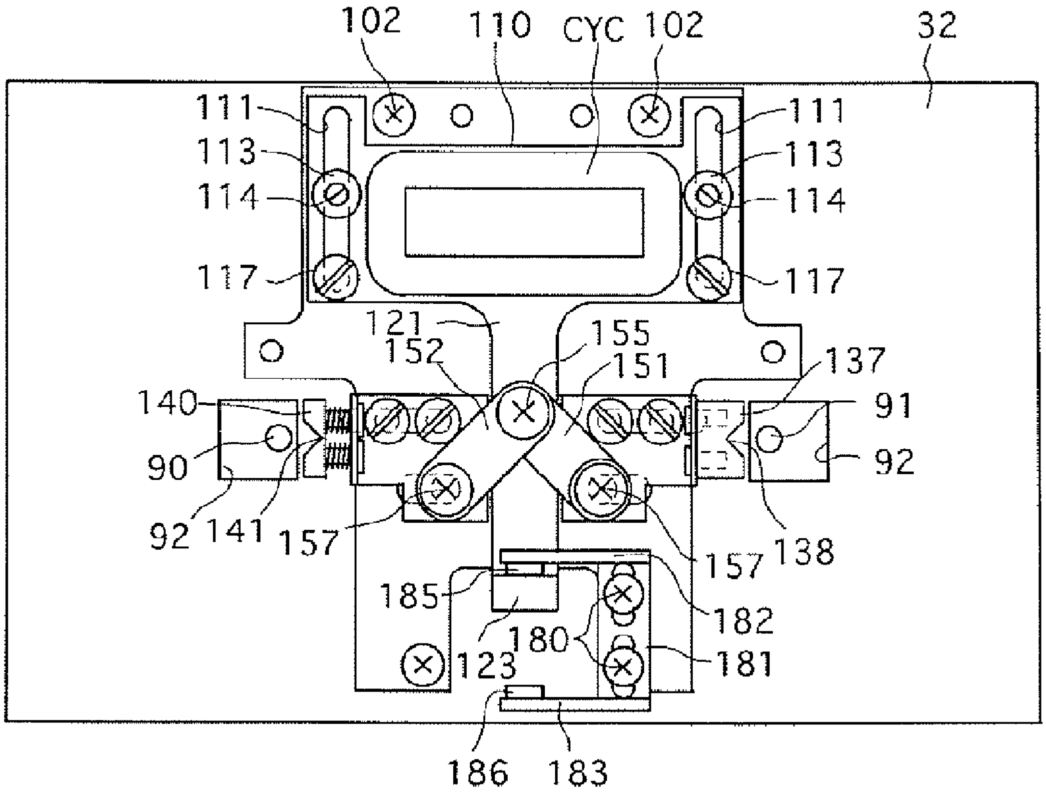
FIG. 14 is a rear view of the lock mechanism of the second embodiment in a disengaged state, with a rear yoke omitted for clarity.

The second embodiment not only provides the front yoke 101, the rear yoke 170, the permanent magnet 172, and the Y-direction drive coil CYC as a lock driving device for moving the Y-direction slide plate 110 and the link members 151 and 152 from the disengaged position (the position shown in FIG. 14) to the engaged position (the position shown in FIG. 15), but also as an unlock driving device for moving the Y-direction slide plate 110 and the link members 151 and 152 from the engaged position (FIG. 15) to the disengaged position (FIG. 14).

As shown in FIG. 14, when the Y-direction slide plate 110 and the link members 151 and 152 are positioned at the disengaged position, supply of electric current from the controller to the Y-direction drive coil CYC is stopped. However, since the magnetic plate 123 is magnetically attracted to the permanent magnet 185 so as to contact each other, the lock members 140 and 137 are held (retained) at the disengaged position.

Figure 15:
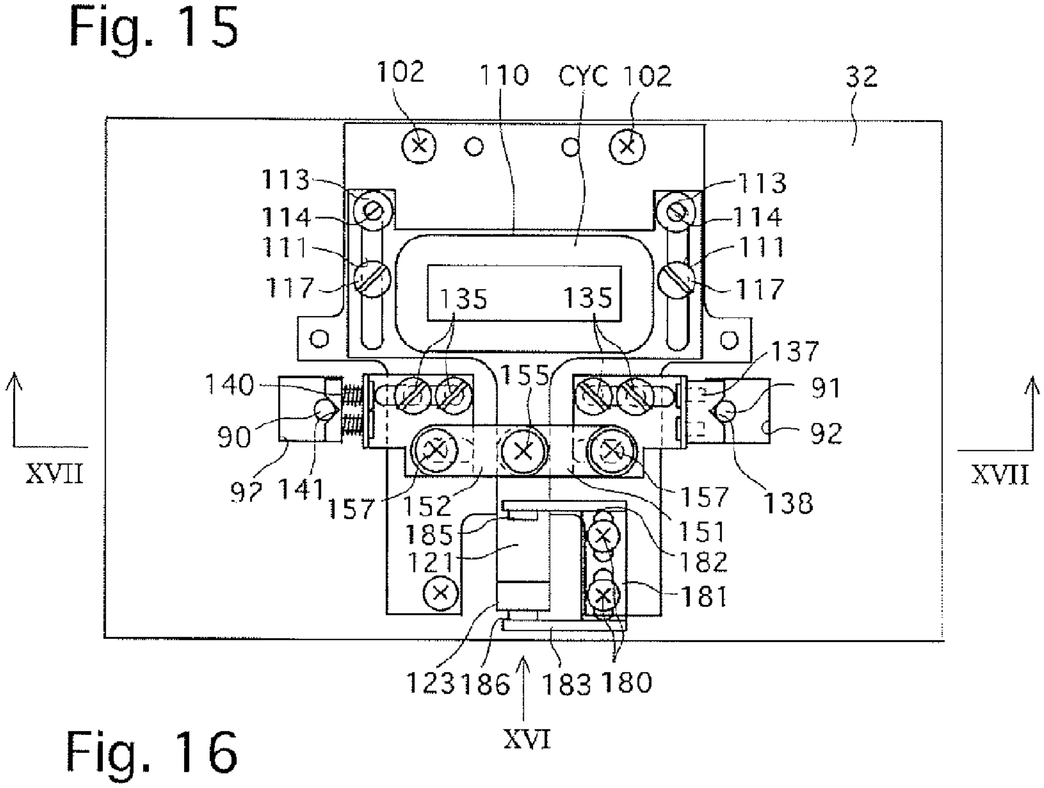
FIG. 15 is a rear view of the lock mechanism of the second embodiment in an engaged state, with the rear yoke omitted for clarity.
Figure 16:
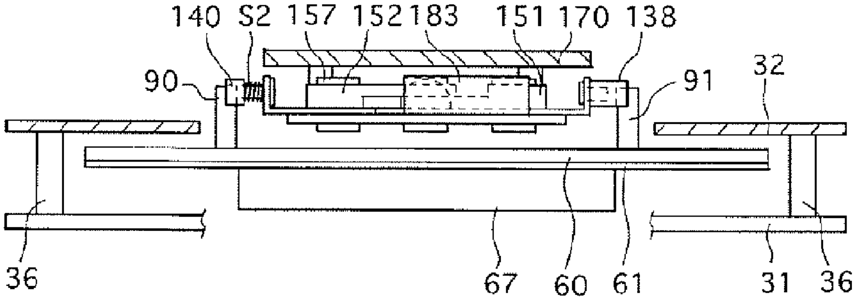
FIG. 16 is a bottom view of the camera-shake correction apparatus, as viewed in the direction of the arrow XVI shown FIG. 15.
Figure 17:
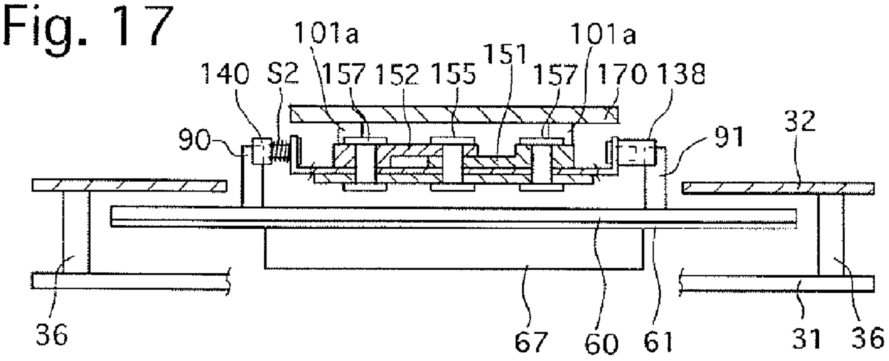
FIG. 17 is a cross-sectional view of the camera-shake correction apparatus taken along the XVII-XVII line shown in FIG. 15.

If an electric current is supplied to the Y-direction drive coil CYC in a direction opposite to that of the arrows shown FIG. 12 so that a linear drive force FY4 occurs therein in a state where the Y-direction slide plate 110 and the link members 151 and 152 are positioned at the disengaged position, this linear drive force releases the magnetic contact between the magnetic plate 123 and the permanent magnet 185, so that the Y-direction slide plate 110 and the link members 151 and 152 move to the engaged position shown in FIG. 15. Thereupon, the magnetic plate 123 and the permanent magnet 186 are magnetically attracted so as to contact each other so that the lock members 140 and 137 are held (retained) at the engaged position.

Since the lock mechanism 100 of the second embodiment does not require the extension springs S1 of the first embodiment, the linear drive force of the Y-direction drive coil CYC does not get partially cancelled out by the biasing force of the extension springs S1 upon the lock members 140 and 137 moving from the disengaged position to the engaged position. Accordingly, the electrical power can be utilized more efficiently in the second embodiment compared to the first embodiment, and it is possible to simplify the structure of the lock mechanism 100.

Although the present invention has been described with reference to the above first and second embodiments, the present invention is not limited thereto, and various modifications of the above described first and second embodiments are possible.

For example, in the first embodiment, although the Y-direction slide plate 110 is biased to move toward the disengaged position by the extension springs S1, a biasing device other than the extension springs S1 can be used. For instance, the Y-direction slide plate 110 can be biased to move toward the disengaged position by compression springs.

Furthermore, the magnetic plate 123 can be replaced with a permanent magnet, and the permanent magnets 164, 185 and 186 can be replaced with metal magnetic plates, so that these metal magnetic plates can be magnetically attracted to the permanent magnet which replaces the magnetic plate 123 so as to contact each other, in order to hold (retain) the lock members 140 and 137 at the engaged position and the disengaged position.

Furthermore, the lock driving device (and the unlock driving device) can be constructed so that the magnetic-force generator is provided on the Y-direction slide plate 110 and the Y-direction drive coil CYC is fixed to the rear stationary support board 32.

In addition, the driving device for moving Y-direction slide plate 110 can alternatively be a motor or an piezoelectric element.

Furthermore, the engaging members which can be used are not limited to the engaging pins 90 and 91; any other protrusions having d rectangular/square columnar shape or protrusions having an alternative sectional shape can be used so long as such protrusions are engageable with the lock members 140 and 137. Moreover, the V-shaped lock-engaging grooves 141 and 138 can have a shape other than a V-shape, e.g., an arc shape, etc., so long as the engaging members (engaging pins 90 and 91) are engageable therewith.

An image pickup device other than a CCD (CCD 65) can be used, e.g., a CMOS imaging sensor can of course be alternatively used.

Furthermore, a convention camera-shake (hand-shake) correction apparatus which only linearly moves the movable stage 62 in the X-direction and the Y-direction can be applied to the lock mechanism 100 of the present invention, or a stage apparatus (an apparatus in which a specific member is linearly movable in the X-direction and/or Y-direction, or rotatable) having a different usage to that of a camera-shake correction apparatus can be applied to the lock mechanism 100 of the present invention.

Although in the illustrated embodiment only the left lock member 140 resiliently engages with the engaging pin 90, in an alternative embodiment, the right lock member 137 can be constructed so as to resiliently engage with the engaging pin 91. Alternatively, both of the left and right lock members 140 and 137 can be constructed so as to both resiliently engage with the engaging pins 90 and 91, respectively.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lock mechanism for a stage apparatus, comprising:

a movable stage which is provided on a stationary member movable in a reference plane;

a pair of engaging members provided on said movable stage;

a pair of lock members which are positioned between said engaging members and are movable so as to engage and disengage with corresponding said engaging members, said lock members being movable along a straight imaginary line passing through said engaging members;

a first link member which is movable in a plane parallel to said reference plane in a direction along a reference straight line which passes through a central position of pair of said engaging members and is orthogonal to the moving direction of said lock members;

a pair of second link members symmetrically arranged with respect to said reference straight line, wherein one end of each of said second link members is rotatably mounted on said first link member via a first rotational axis, and the other end of each of said second link members is rotatably mounted on a corresponding said lock member via a second rotational axis, said first and second rotational axes extending normal to said reference plane;

a lock driving device which moves said lock members to an engaged position wherein said lock members mutually move away from each other and engage with said corresponding engaging members by moving said first link member in one direction along said reference straight line; and an unlock driving device which moves said lock members to a disengaged position wherein said lock members mutually move toward each other so as to disengage with said corresponding engaging members by moving said first link member in the other direction along said reference straight line.

2. The lock mechanism for the stage apparatus according to claim 1, wherein each of said second link members comprises a linear shaped member; and wherein said lock members are positioned at said engaged position when axial lines of said link members extend in a common straight line which is aligned in a direction of said straight imaginary line passing through said lock members.

3. The lock mechanism for the stage apparatus according to claim 1, wherein said lock driving device comprises:

a magnetic-force generator provided on one of said first link member and said stationary member; and a drive coil fixed to the other of said first link member and said stationary member, said drive coil generating a linear drive force in a direction along said reference straight line upon receiving electric current while receiving a magnetic force from said magnetic-force generator;

wherein said linear drive force in said direction along said reference straight line is converted into a linear drive force along said straight imaginary line passing through said lock members via said first link member and said second link members.

4. The lock mechanism for the stage apparatus according to claim 1, wherein said unlock driving device comprises:

a biasing device, each end of which is connected to said first link member and said stationary member, respectively, so as to exert a biasing force in said reference straight line direction.

5. The lock mechanism for the stage apparatus according to claim 1, further comprising:

a first retaining device for holding said lock members at said engaged position upon said lock members being moved to said engaged position; and a second retaining device for holding said lock members at said disengaged position upon said lock members being moved to said disengaged position.

6. The lock mechanism for the stage apparatus according to claim 5, wherein said first retaining device comprises:

a magnet fixed to one of said first link member and said stationary member; and a magnetic plate which is magnetically attracted to said magnet so as to contact each other when said first link member and said second link members are positioned at said engaged position.

7. The lock mechanism for the stage apparatus according to claim 5, wherein said second retaining device comprises:

a biasing device which biases said first link member and said second link members to said disengaged position.

8. The lock mechanism of the stage apparatus according to claim 5, wherein said second retaining device comprises:

a magnet which is fixed to one of said first link member and said stationary member; and a magnetic plate fixed to the other of said first link member and said stationary member, said magnetic plate being magnetically attracted to said magnet so as to contact each other when said first link member and said second link members are positioned at said disengaged position.

9. The lock mechanism of the stage apparatus according to claim 1, wherein at least one of said lock members resiliently engages with a corresponding said engaging member.

* * * * *